(12) United States Patent
Iyer et al.

(10) Patent No.: US 9,438,435 B2
(45) Date of Patent: Sep. 6, 2016

(54) SECURE, MULTI-TENANCY AWARE AND BANDWIDTH-EFFICIENT DATA CENTER MULTICAST

(71) Applicant: International Business Machines Corporation, Armonk, NY (US)

(72) Inventors: Aakash S. Iyer, New Delhi (IN); Praveen Kumar, Gorakhpur (IN); Vijay Mann, Gurgaon (IN)

(73) Assignee: Intenational Business Machines Corporation, Armonk, NY (US)

( * ) Notice: Subject to any disclaimer, the term of this patent is extended or adjusted under 35 U.S.C. 154(b) by 140 days.

(21) Appl. No.: 14/169,956

(22) Filed: Jan. 31, 2014

(65) Prior Publication Data
US 2015/0222445 A1    Aug. 6, 2015

(51) Int. Cl.
*H04L 12/28* (2006.01)
*H04L 12/18* (2006.01)

(52) U.S. Cl.
CPC ........... *H04L 12/185* (2013.01); *H04L 12/184* (2013.01)

(58) Field of Classification Search
USPC .......... 370/238–242, 312–390; 709/223–245
See application file for complete search history.

(56) References Cited

U.S. PATENT DOCUMENTS

| | | | |
|---|---|---|---|
| 6,483,832 B1* | 11/2002 | Civanlar et al. | 370/390 |
| 6,771,593 B2* | 8/2004 | Popovich | 370/218 |
| 7,640,333 B1* | 12/2009 | Fernandez Gutierrez | 709/223 |
| 8,094,602 B2* | 1/2012 | Gutierrez | 370/312 |
| 8,370,496 B1 | 2/2013 | Marr | |
| 8,522,288 B2* | 8/2013 | Ikeda et al. | 725/86 |
| 8,780,908 B2* | 7/2014 | Mentze et al. | 370/390 |
| 9,083,645 B2* | 7/2015 | Janardhanan et al. | |
| 2008/0198771 A1* | 8/2008 | Iyengar | 370/270 |
| 2011/0267962 A1* | 11/2011 | J S A et al. | 370/242 |
| 2013/0022040 A1 | 1/2013 | Davis et al. | |
| 2013/0028091 A1 | 1/2013 | Sun et al. | |
| 2013/0058341 A1 | 3/2013 | Fulton et al. | |
| 2013/0144973 A1 | 6/2013 | Li et al. | |
| 2013/0223442 A1 | 8/2013 | Narayanan et al. | |
| 2013/0266007 A1 | 10/2013 | Kumbhare et al. | |
| 2013/0272133 A1* | 10/2013 | Yalagandula et al. | 370/238 |
| 2014/0079059 A1* | 3/2014 | Amir et al. | 370/390 |
| 2014/0105209 A1* | 4/2014 | McCanne | 370/390 |

FOREIGN PATENT DOCUMENTS

CN    103179046 A    6/2013

OTHER PUBLICATIONS

Satishkumar, K., et al., "Efficient and Scalable Data Centre Multicast Routing," Indian Streams Research Journal, National Conference on Methods Enriching Power & Energy Developments (MEPED '13), Apr. 12, 2013, Chennai, Tamil Nadu, India, pp. 1-8.

(Continued)

*Primary Examiner* — Man Phan
(74) *Attorney, Agent, or Firm* — Ference & Associates LLC (57) ABSTRACT

Methods and arrangements for providing multicast communication. There is defined a first multicast tenant group comprising a plurality of hosts distributed over a plurality of locations. Communication is established with respect to the first multicast tenant group via: defining a routing tree, and using a multicast address space for communication with the hosts via the routing tree. The multicast address space is reused with respect to a second multicast tenant group. Other variants and embodiments are broadly contemplated herein.

16 Claims, 6 Drawing Sheets

(56) References Cited

OTHER PUBLICATIONS

Nakagawa, Yukihiro, et al., "A Management Method of IP Multicast in Overlay Networks using OpenFlow," Hot Topics in Software Defined Networking (HotSDN'12), Aug. 13, 2012, Helsinki, Finland, pp. 91-96, ACM Digital Library.

Beck, Pall, et al., "IBM and Cisco Together for a World Class Data Center," Redbooks, First Edition (Jul. 2013), 654 pages total (3 pages provided), Full copy can be obtained at URL: http://www.redbooks.ibm.com/redbooks/pdfs/sg248105.pdf, Accessed Jan. 9, 2014.

Qazi, Zafar Ayyub, et al., "Simple-fying Middlebox Policy Enforcement Using SDN," Association for Computing Machinery's Special Interest Group on Data Communications (SIGCOMM,13), Aug. 12-16, 2013, Hong Kong, China, 12 pages, ACM Digital Library.

* cited by examiner

SECURE, MULTI-TENANCY AWARE AND BANDWIDTH-EFFICIENT DATA CENTER MULTICAST

BACKGROUND

Generally, group communication is extensively used in data centers, and multicast communication (or "multicast") represents one manner of facilitating the same; generally, multicast involves the delivery of a message or information to a group of destination computers simultaneously in a single transmission from the source. Some examples include the open source Hadoop® MapReduce implementation, which uses data replication for higher availability, clustered application servers which require state synchronization, and cloud environments which require OS (operating system) and application image installation on a group of virtual machines. (Hadoop® is a registered trademark of the Apache Software Foundation.) Multicast lends itself naturally to these communication patterns. IP (Internet protocol) multicast, which has been in existence for several years, is a highly common multicast implementation for traditional networks.

Conventionally, multicast has remained largely undeployed (e.g., in the Internet) owing to concerns surrounding reliability, scalability and security. Particular concerns specific to the adoption of traditional multicast to cloud data centers have arisen. For instance, multicast is not usually configured in such cases to exploit path diversity and does not serve to build optimal routing trees. Commodity switches may not have default multicast support, and multi-tenancy support is also typically not present. These concerns, and others, do not lend themselves to viable, deployable solutions.

BRIEF SUMMARY

In summary, one aspect of the invention provides a method of providing multicast communication, said method comprising: defining a first multicast tenant group comprising a plurality of hosts distributed over a plurality of locations; establishing communication with respect to the first multicast tenant group; said establishing of communication comprising: defining a routing tree; and using a multicast address space for communication with the hosts via the routing tree; and reusing the multicast address space with respect to a second multicast tenant group.

Another aspect of the invention provides an apparatus comprising: at least one processor; and a computer readable storage medium having computer readable program code embodied therewith and executable by the at least one processor, the computer readable program code comprising: computer readable program code configured to define a first multicast tenant group comprising a plurality of hosts distributed over a plurality of locations; computer readable program code configured to establish communication with respect to the first multicast tenant group, via: defining a routing tree; and using a multicast address space for communication with the hosts via the routing tree; and computer readable program code configured to reuse the multicast address space with respect to a second multicast tenant group.

An additional aspect of the invention provides a computer program product comprising: a computer readable storage medium having computer readable program code embodied therewith, the computer readable program code comprising: computer readable program code configured to define a first multicast tenant group comprising a plurality of hosts distributed over a plurality of locations; computer readable program code configured to establish communication with respect to the first multicast tenant group, via: defining a routing tree; and using a multicast address space for communication with the hosts via the routing tree; and computer readable program code configured to reuse the multicast address space with respect to a second multicast tenant group.

A further aspect of the invention provides a method comprising: defining a first multicast tenant group comprising a plurality of hosts; establishing communication with respect to the first multicast tenant group; said establishing of communication comprising: defining a first routing tree; establishing a first set of forwarding rules; and using a multicast address space for communication with the hosts via the first routing tree; and permitting reuse of the multicast address space with respect to a second multicast tenant group via: defining a second routing tree with respect to the second multicast tenant group, the second routing tree being different from the first routing tree; and establishing a second set of forwarding rules for the second multicast tenant group, the second set of forwarding rules being different from the first set of forwarding rules.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made herebelow to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 6, whether on a server computer, a client computer, a node computer in a distributed network, or any combination thereof.

Figure 1:
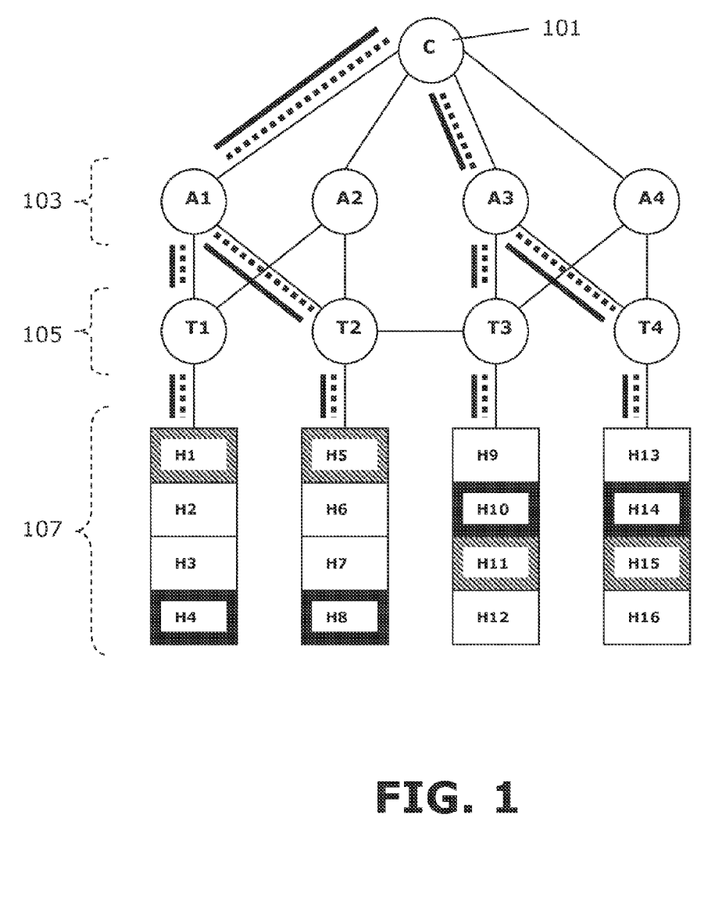
FIG. 1 schematically illustrates an example of a conventional multicast system.
Figure 2:
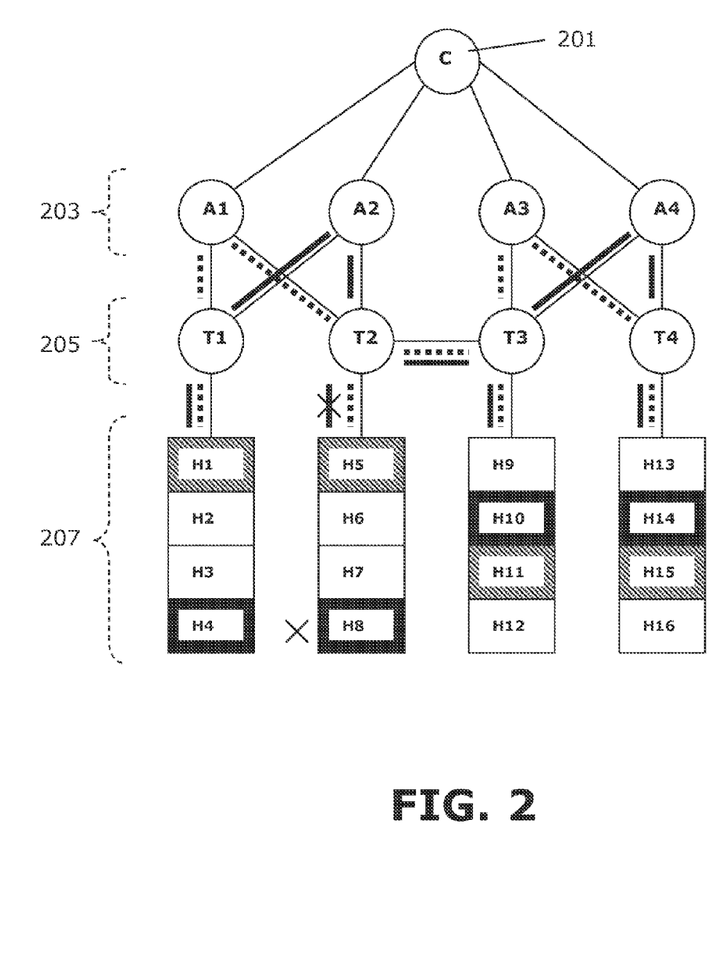
FIG. 2 schematically illustrates an example of a multicast system in accordance with at least one embodiment of the invention.
Figure 3:
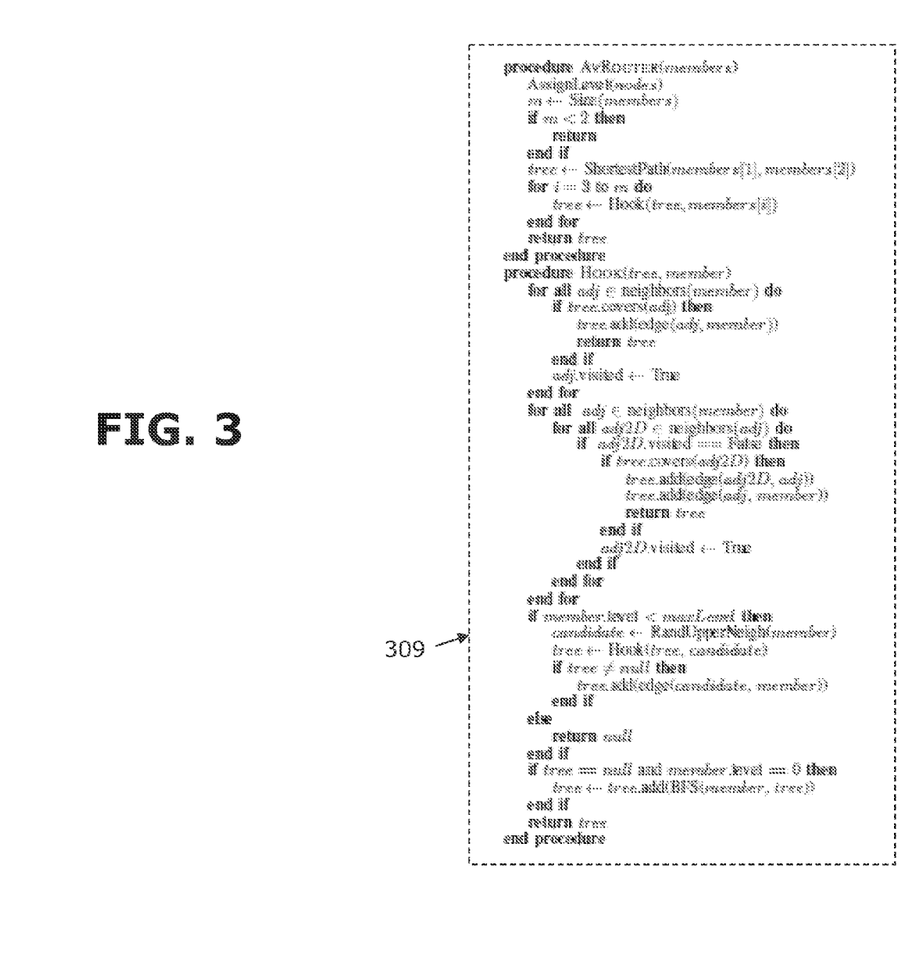
FIG. 3 sets forth an illustrative example of a routing algorithm in accordance with at least one embodiment of the invention.
Figure 4:
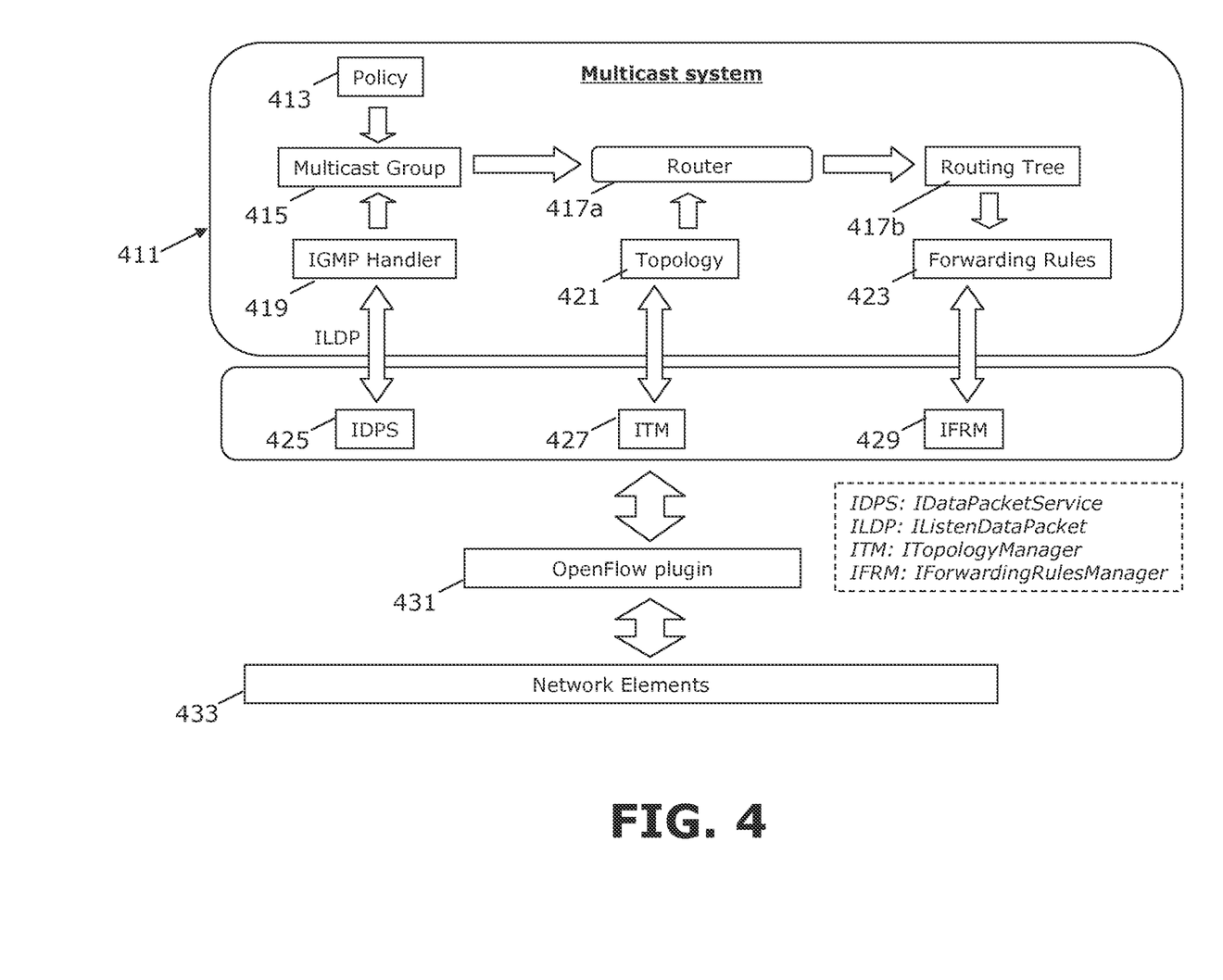
FIG. 4 schematically illustrates a system architecture, in accordance with at least one embodiment of the invention.

To facilitate easier reference, in advancing from FIG. 1 to and through FIG. 4, a reference numeral is advanced by a multiple of 100 in indicating a substantially similar or analogous component or element with respect to at least one component or element found in at least one earlier figure among FIGS. 1-4.

Broadly contemplated herein, in accordance with at least one embodiment of the invention, are solutions for multicast based on software-defined networking (SDN) that involve leveraging properties of data centers and SDN such as centralized control, centralized visibility, and structured topologies. This permits multicast that is secure, multi-tenancy aware and bandwidth-efficient in switches that do not have any inbuilt IP multicast support. Also supported herein are dynamic joins of multicast members as typically encountered in IP multicast. However, unlike IP multicast, arrangements herein are also able to deny admission to a member based on pre-defined policies.

There is also broadly contemplated herein, in accordance with at least one embodiment of the invention, a multicast routing algorithm which aims to minimize the size of a routing tree created for each multicast tenant group. Accordingly, whenever a new member joins a group, the routing algorithm attempts to attach it to the existing tree at the nearest attachment point.

FIG. 1 schematically illustrates an example of a conventional multicast system, with respect to a context of at least one embodiment of the invention. As shown, a core switch C (101) is in communication with a first set of routing nodes A1 . . . A4 (103), also referred to as Aggregation Switches, themselves in communication with a second set of routing nodes T1 . . . T4 (105), also referred to as Top-of-Rack (ToR) switches. There are sixteen hosts H1 . . . H16 (107), arranged in groups (which may also be referred to as stacks or clusters, comprising different locations) of four as shown. Two multicast groups (which can also be referred to as "multicast tenant groups", "tenant groups" or simply "tenants") among these hosts 107 are shown via shading/highlighting. A first group, which can be referred to as Tenant 1, includes hosts {H1, H5, H11, H15} illustrated with hatching. A second group, which can be referred to as Tenant 2, includes hosts {H4, H8, H10, H14} illustrated with solid highlighting. Routing trees providing communication from core switch C (101) to the respective Tenants 1 and 2, via routing node sets 103 and 105, is shown with added dotted lines and thick solid lines, respectively. (In other words, routing trees herein can be understood to relate to those nodes and links [or edges] that are employed in one-to-many communication in a multicast context.) Of the two trees so illustrated, it can be seen that there are eight nodes and ten edges per tree.

FIG. 2 schematically illustrates an example of a multicast system in accordance with at least one embodiment of the invention. Included among advantages of arrangements in accordance with at least one embodiment of the invention (e.g., the arrangement of FIG. 2) are: path diversity exploration, tenant separation, security and a provision for multicast in commodity switches. Such advantages are lacking from conventional arrangements such as that shown in FIG. 1. Particularly, in arrangements such as those shown in FIG. 2, global visibility is leveraged to route different multicast groups on different trees. Further, policy enforcement can be leveraged to deny admission to a suspicious tenant (e.g., H8) that may want to hack into a multicast group. SDN is also leveraged to permit multicast support in commodity switches, which may not have inherent support for multicast.

Additionally, in accordance with at least one embodiment of the invention, trees are restricted to tenant boundaries, thus permitting a reuse of multicast addresses (or multicast address space) in a multi-tenant environment. This is explained more fully below. ("Multicast address space" can relate to a set of one or more multicast addresses employed in communicating with hosts in the course of multicast communication.)

In accordance with a context of at least one embodiment of the invention, there are two types of lookup tables available in typical switches, namely, TCAM (Ternary Content Addressable Memory) or FDB (Forwarding Database, or Layer 2 [L2] table). Forwarding rules installed in FDB can match a packet only on a VLAN (Virtual Local Area Network) ID and destination Ethernet address, while those installed in TCAM can match on other properties as well, such as in_port, source, Ethernet address etc.

In accordance with a context of at least one embodiment of the invention, in a multi-tenant shared cloud infrastructure, multiple tenants use the same layer 3 (IP) address range. The multicast IP addresses are in the range 224.0.0.0 through 239.255.255.255. These IP addresses map to fixed Ethernet addresses in the range of 01:00:53:00:00:00 through 01:00:5e:7f:ff:ff. In the event that hosts belonging to different tenants try to use the same multicast group address, a multicast system needs to distinguish between the traffic belonging to the two groups and route accordingly.

In view of the foregoing, in accordance with at least one embodiment of the invention, a VLAN ID or source Ethernet address is used, in addition to a multicast destination Ethernet address, to identify a tenant and build separate forwarding rules.

In accordance with at least one embodiment of the invention, in a TCAM mode, a system installs forwarding rules which match on the sender host's Ethernet address and the Ethernet address corresponding to the layer 3 multicast group address. Differentiation among the tenants is achieved here through the use of the source's Ethernet address. Particularly, it is recognized here that a host's Ethernet address is unique in the network; thus, the sender's Ethernet address is sufficient to identify a tenant. Accordingly, even if multiple tenants are using the same multicast address, the multicast routing trees and forwarding rules for the two tenants will be different. The action part of these rules instructs the switch to send out the packets on one or more ports depending on the multicast routing tree. The ingress port is never a part of the set of output ports, to avoid bouncing on packets back-and-forth between two switches. Such a rule which matches on the Ethernet address of a packet's source cannot be installed in the FDB. Thus, a sample rule might be expressed as:

MATCH: src-mac:00-00-29-5a-12-5a, dst-mac:01-00-5e-00-01-23

ACTION: output: 2, 4, 5

However, in accordance with at least one embodiment of the invention, it is recognized that TCAM is costly. Generally, in order to handle the very large number of tenants and multicast groups in a data center, it is recognized that TCAM capacity might not be enough. The power consumption of a typical 18 Mbits TCAM is about 15 watts, and it usually is very costly to purchase. Compared to TCAM, FDB is much cheaper. At the same time, the number of FDB rules that can be installed in typical datacenter switches is also very high. To leverage this, there is broadly contemplated herein an FDB mode wherein, whenever possible, the system automatically tries to use FDB instead of TCAM.

Accordingly, in accordance with at least one embodiment of the invention, with rules installed in a switch's FDB needing to show a match on VLAN ID, an assurance is made that a VLAN ID is associated with a tenant's multicast group. To thereby ensure that the multicast packets are tagged with a VLAN ID, the system (in FDB mode) installs special rules on the ingress switch to identify the tenant of a multicast packet (based on source Ethernet address) and push a VLAN header on the multicast packets. (An ingress switch is the switch to which the host sending multicast traffic is directly connected.) A central pool of VLAN IDs is maintained from which the system allocates a unique VLAN ID to each tenant. Multicast packets belonging to different tenants are tagged with different VLAN IDs for the purpose of differentiation.

In accordance with at least one embodiment of the invention, once the packets at the ingress switches are tagged with the tenant's VLAN ID, routing inside the core network takes place based on rules installed in the FDB. These rules match on the multicast Ethernet address (non-unique among tenants) and the VLAN ID (unique) associated with the tenant, thus ensuring differentiation among tenants. The action part of such rules contains the list of output ports. In FDB mode, the ingress port can be a part of this list because FDB rules don't send a packet back through the ingress port. On the other hand, the switches directly connected to hosts receiving multicast traffic are the egress switches. At every egress switch, the extra VLAN header (pushed at ingress switch) is removed. A system herein installs a special rule to pop these VLAN headers at the egress switches and forward the untagged packet to the receivers connected to that switch. Some sample rules might be expressed as follows:

On an ingress switch:
MATCH: src-mac: 00-00-29-5a-12-5a, dst-mac: 01-00-5e-00-01-23

ACTION: push-vlan: 123, output: 2

On core switches:
MATCH: dst-mac:01-00-5e-00-01-23, vlan-id: 123
ACTION: output: 2, 4, 5

On egress switches:
MATCH: dst-mac:01-00-5e-00-01-23, vlan-id: 123
ACTION: pop-vlan, output: 1, 2

In accordance with at least one embodiment of the invention, since TCAM generally is more costly and presents limited space compared to FDB, FDB can often represent a preferred mode of operation for this system. However, FDB mode cannot always be used since, in FDB mode, special rules are installed at egress switches in order to pop the VLAN header. In case a switch acts as an egress switch for some host (e.g., H1) and as a core switch for another host (e.g., H2) belonging to the same multicast group, the system cannot install the correct rule (e.g., forward towards H2, pop VLAN and then forward to H1—in order) because of limitations in which the actions of a forwarding rule are processed in the switch and OpenFlow 1.0. In such a scenario, the system will switch to TCAM mode. As a TCAM-based solution doesn't have any such constraint, the system can still fall back to TCAM mode whenever FDB mode is not feasible.

FIG. 3 sets forth an illustrative example of a routing algorithm 309 in accordance with at least one embodiment of the invention, e.g., which may be employed to bring about the routing illustrated in FIG. 2. Other routing algorithms can be employed in accordance with embodiments of the invention, and the example shown in FIG. 2 is intended to be merely illustrative, and not restrictive. This routing algorithm can be referred to as the "Avalanche Routing Algorithm".

In accordance with at least one embodiment of the invention, the Avalanche Routing Algorithm (AvRA) is a polynomial time algorithm that builds a multicast routing tree by attempting to attach each new group member to the existing tree at the nearest intersection. In theory, this can be trivially accomplished by computing the shortest path from the new member to each node on the existing tree. However, this is computationally prohibitive. AvRA performs this attachment using a unique method which completes in polynomial time. Although it is possible that AvRA may not always be able to find the best attachment point for all topologies, it does so with high probability in practice for most topologies. Specifically, for Tree and FatTree topologies, it does so with probability 1. In case AvRA is unable to find the optimal path, it still finds a path that is at least as short as that found by state of the art algorithms.

In accordance with at least one embodiment of the invention, AvRA first assigns a level to all nodes in the network. This level classifies the node's distance, in terms of a number of hops, from a physical server. Thus, all physical servers are assigned level 0, all top-of-racks (ToRs) are assigned level 1, and so on. While creating the routing tree for a group, AvRA iterates through the group members one by one and attaches them to the tree. In this regard, the tree created is a function of the order in which members appear. Regardless of the ordering though, the tree created is near-optimal and at least as small as that created by conventional algorithms.

In accordance with at least one embodiment of the invention, tree building begins once there are at least 2 members in the group. To connect the first 2 members, the algorithm chooses the shortest path between them. Subsequently, whenever a new member appears, the algorithm tries to find its nearest intersection to the existing tree. To do so, it first checks if any of its adjacent nodes reside on the existing tree. Thus, when a new member, which would by definition be a level 0 node, appears, all its adjacent (level 1) nodes are checked. If any of these nodes already reside on the existing tree, the new member is simply attached to the tree at this point. If none of these adjacent nodes lies on the tree, the algorithm then looks at all neighbors (level 0, level 1 and level 2) of the adjacent nodes. If any of these neighboring nodes lies on the existing tree, the algorithm attaches the new member to the tree at this point.

In accordance with at least one embodiment of the invention, if neither this new member's adjacent nodes nor their neighbors lie on the existing tree, then one of the member's adjacent nodes at the next higher level is randomly chosen. Note that in this case, the new member has not yet been attached to the tree so the algorithm continues. Next, this chosen adjacent node is set as the current node. Now, its adjacent nodes (some of which would have already been examined in the previous iteration) and their neighbors are examined to see if any fall on the existing tree. If any of them does, the new member is connected to the tree at this node by tracing the path chosen from the new member onwards. If, on the other hand, neither of them lies on the existing tree, the algorithm continues by randomly choosing one of the current node's adjacent nodes at the next higher level. This chosen node is now set as the current node. In this manner, the algorithm continues until either the new member is connected to the existing tree or until the level of the current node reaches the highest level in the topology.

In accordance with at least one embodiment of the invention, if the algorithm has already reached the highest level and has still been unable to attach the new member onto the tree, then it resorts to a breadth first search (BFS) with a stop condition that terminates as soon as an attachment point to the tree is found. In the event that the algorithm does indeed reach the highest level without converging, which is unlikely owing to the random selection of next nodes, the overhead incurred from this unsuccessful search is very small since typical data center topologies are only 3 to 4 levels high. This is computationally far less expensive than using BFS for each new member.

In accordance with at least one variant embodiment of the invention, a different routing algorithm may be used, such as one which may be referred to as "Source Based Routing Trees". In this algorithm, a unique routing tree is created per sender per multicast group. The algorithm iterates incrementally through all receivers in the group and incrementally builds the routing tree by computing the shortest path from each receiver to the sender. At each iteration, if the shortest path from the current receiver to the sender intersects the existing tree at any node, the receiver is attached to the tree at this node, referred to as the attachment point. The tree thus created is rooted at the sender and traffic flows on this tree only in one direction, i.e., from the sender to the receivers. The number of trees created per multicast group therefore is equal to the number of subscribers that are acting as senders in that group.

FIG. 4 schematically illustrates a system architecture, in accordance with at least one embodiment of the invention. As shown, in a multicast system 411, an applied policy 413 can permit secure multicast with respect to a multicast group 415. A router 417*a*, as broadly contemplated herein, can help ensure optimal formation of a routing tree 417*b*, and this formation can include path diversity exploitation and tenant separation. An IGMP handler 419 supports dynamic join and leave with respect to multicast group 415. Among other components of system 411, a predetermined topology 421 can be applied for use by router 417*a*, while routing tree 417*b* can establish forwarding rules 423. Other components, as shown, can include an IData Packet Service 425 (in communication with IGMP handler 419 via IListen Data Packets), an ITopology Manager 427 and an IForwarding Rules Manager 429. Components 425/427/429 may be in communication with an OpenFlow plugin 431, itself in communication with network elements 433.

Recapitulating, some features and advantages associated with at least one embodiment of the invention include:
 easy deployment in OpenFlow-enabled commodity switches which may not have any default multicast support, via SDN support for multiple output port actions;
 security, via SDN support for policy enforcement;
 multi-tenancy awareness, or tenant separation, whereby routing trees are built which are restricted to tenant boundaries, thereby enabling reuse of the multicast address space;
 bandwidth efficiency, via SDN support for global visibility which is leveraged for optimal tree computation and path diversity exploitation; and
 support of a dynamic join and leave of hosts, via SDN-based rules for IGMP snooping.

Figure 5:
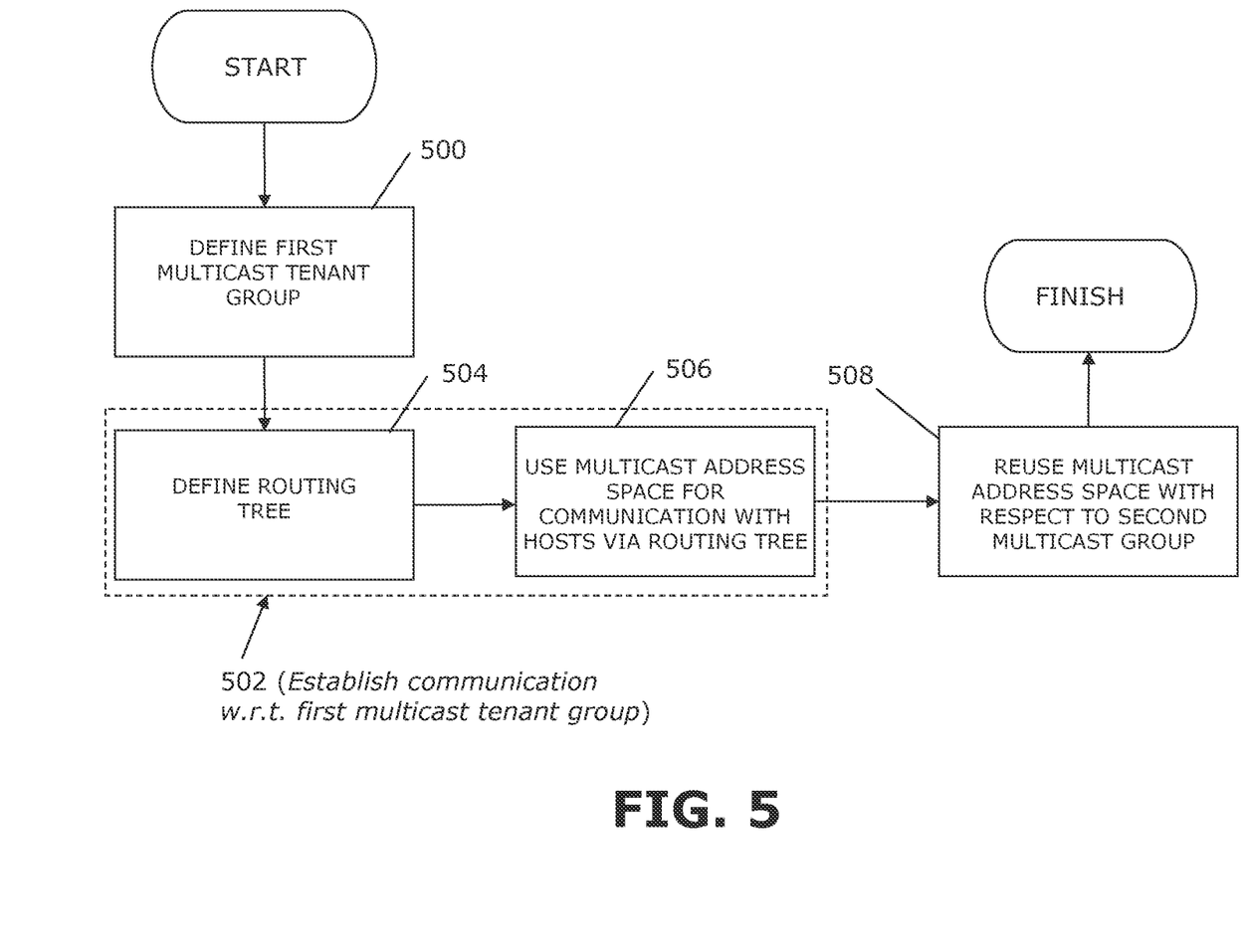
FIG. 5 sets forth a process more generally for providing multicast communication.

FIG. 5 sets forth a process more generally for providing multicast communication, in accordance with at least one embodiment of the invention. It should be appreciated that a process such as that broadly illustrated in FIG. 5 can be carried out on essentially any suitable computer system or set of computer systems, which may, by way of an illustrative and non-restrictive example, include a system such as that indicated at 12' in FIG. 6. In accordance with an example embodiment, most if not all of the process steps discussed with respect to FIG. 5 can be performed by way of a processing unit or units and system memory such as those indicated, respectively, at 16' and 28' in FIG. 6.

As shown in FIG. 5, in accordance with at least one embodiment of the invention, there is defined a first multicast tenant group comprising a plurality of hosts distributed over a plurality of locations (500). Communication is established with respect to the first multicast tenant group (502) via: defining a routing tree (504), and using a multicast address space for communication with the hosts via the routing tree (506). The multicast address space is reused with respect to a second multicast tenant group (508).

Figure 6:
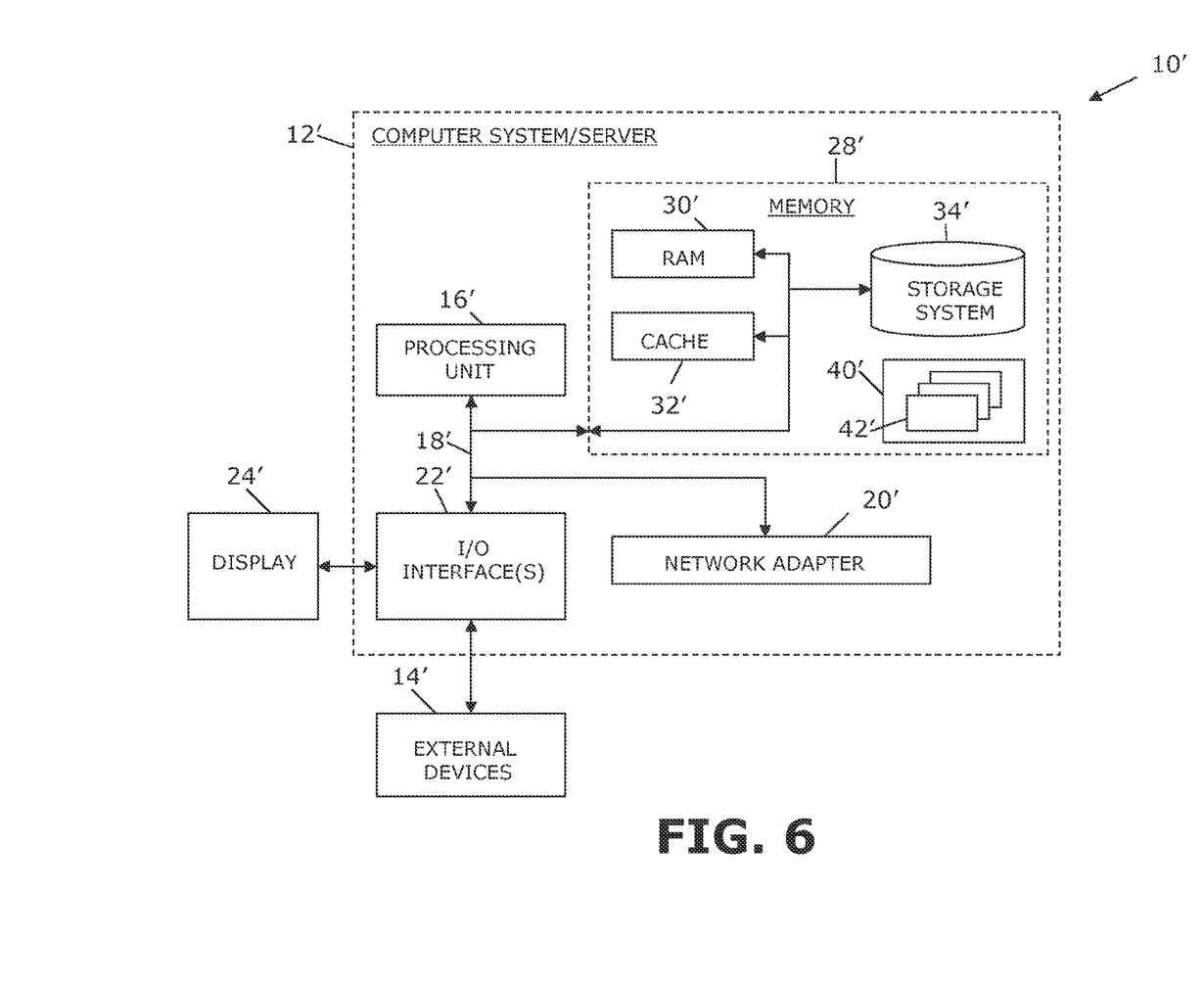
FIG. 6 illustrates a computer system.

Referring now to FIG. 6, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer systemserver 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of providing multicast communication, said method comprising:
    defining a first multicast tenant group comprising a plurality of hosts distributed over a plurality of locations;
    establishing communication with respect to the first multicast tenant group;
    said establishing of communication comprising: defining a routing tree, the routing tree
    comprising a first routing tree;
    using a multicast address space for communication with the hosts via the routing tree; and
    establishing a first set of forwarding rules for the first multicast tenant group;
    reusing the multicast address space with respect to a second multicast tenant group;
    said reusing comprising distinguishing between traffic belonging to the first multicast tenant group and the second multicast tenant group, respectively;
    defining a second routing tree with respect to the second multicast tenant group, the second routing tree being different from the first routing tree; and
    establishing a second set of forwarding rules for the second multicast tenant group.

2. The method according to claim 1, wherein the plurality of locations comprise a plurality of stacks, each stack comprising at least one host.

3. The method according to claim 1, wherein said establishing of communication comprises minimizing the size of the routing tree.

4. The method according to claim 1, wherein said defining of a routing tree comprises restricting the routing tree to boundaries relative to the first multicast tenant group.

5. The method according to claim 1, wherein said establishing of communication comprises using rules to support hosts that dynamically join and leave the first multicast tenant group.

6. The method according to claim 5, wherein said using of rules comprises employing at least one Internet group management protocol message.

7. The method according to claim 1, wherein said reusing comprises uniquely identifying at least one of the first and second multicast tenant groups via using at least one of: a virtual local area network ID and a source media access control address.

8. The method according to claim 1, comprising applying and enforcing an admission policy relative to tenants in the first multicast tenant group.

9. The method according to claim 1, wherein said establishing of communication comprises:
employing software-defined networking; and
routing packets from a multicast sender to the first multicast tenant group based on the routing tree and on at least one enforced policy.

10. The method according to claim 1, comprising accepting a host as a new member of the first multicast tenant group and attaching the new member to a nearest attachment point of the routing tree.

11. An apparatus comprising:
at least one processor; and
a computer readable storage medium having computer readable program code embodied therewith and executable by the at least one processor, the computer readable program code comprising:
computer readable program code configured to define a first multicast tenant group comprising a plurality of hosts distributed over a plurality of locations;
computer readable program code configured to establish communication with respect to the first multicast tenant group, via:
defining a routing tree, the routing tree comprising a first routing tree;
using a multicast address space for communication with the hosts via the routing tree; and
establishing a first set of forwarding rules for the first multicast tenant group;
computer readable program code configured to reuse the multicast address space with respect to a second multicast tenant group, the reusing comprising distinguishing between traffic belonging to the first multicast tenant group and the second multicast tenant group, respectively;
compute readable program code configured to define a second routing tree with respect to the second multicast tenant group, the second routing tree being different from the first routing tree; and
computer readable program code configured to establish a second set of forwarding rules for the second multicast tenant group.

12. A computer program product residing in a non-transitory computer readable medium comprising:
a computer readable storage medium having computer readable program code embodied therewith, the computer readable program code comprising:
computer readable program code configured to define a first multicast tenant group comprising a plurality of hosts distributed over a plurality of locations;
computer readable program code configured to establish communication with respect to the first multicast tenant group, via:
defining a routing tree, the routing tree comprising a first routing tree;
using a multicast address space for communication with the hosts via the routing tree; and
establishing a first set of forwarding rules for the first multicast tenant group;
computer readable program code configured to reuse the multicast address space with respect to a second multicast tenant group, the reusing comprising distinguishing between traffic belonging to the first multicast tenant group and the second multicast tenant group, respectively;
computer readable program code configured to define a second routing tree with respect to the second multicast tenant group, the second routing tree being different from the first routing tree; and
computer readable program code configured to establish a second set of forwarding rules for the second multicast tenant group.

13. The computer program product according to claim 12, wherein the plurality of locations comprise a plurality of stacks, each stack comprising at least one host.

14. The computer program product according to claim 12, wherein said computer readable program code is configured to minimize the size of the routing tree.

15. The computer program product according to claim 12, wherein the routing tree is restricted to boundaries relative to the first multicast tenant group.

16. A method comprising:
defining a first multicast tenant group comprising a plurality of hosts distributed over a plurality of locations;
establishing communication with respect to the first multicast tenant group;
said establishing of communication comprising:
defining a first routing tree;
establishing a first set of forwarding rules for the first multicast tenant group; and
using a multicast address space for communication with the hosts via the first routing tree; and
permitting reuse of the multicast address space with respect to a second multicast tenant group, via distinguishing between traffic belonging to the first multicast tenant group and the second multicast tenant group, respectively;
wherein said permitting of reuse comprises:
defining a second routing tree with respect to the second multicast tenant group, the second routing tree being different from the first routing tree;
establishing a second set of forwarding rules for the second multicast tenant group, the second set of forwarding rules being different from the first set of forwarding rules.

* * * * *